Patented June 1, 1926.

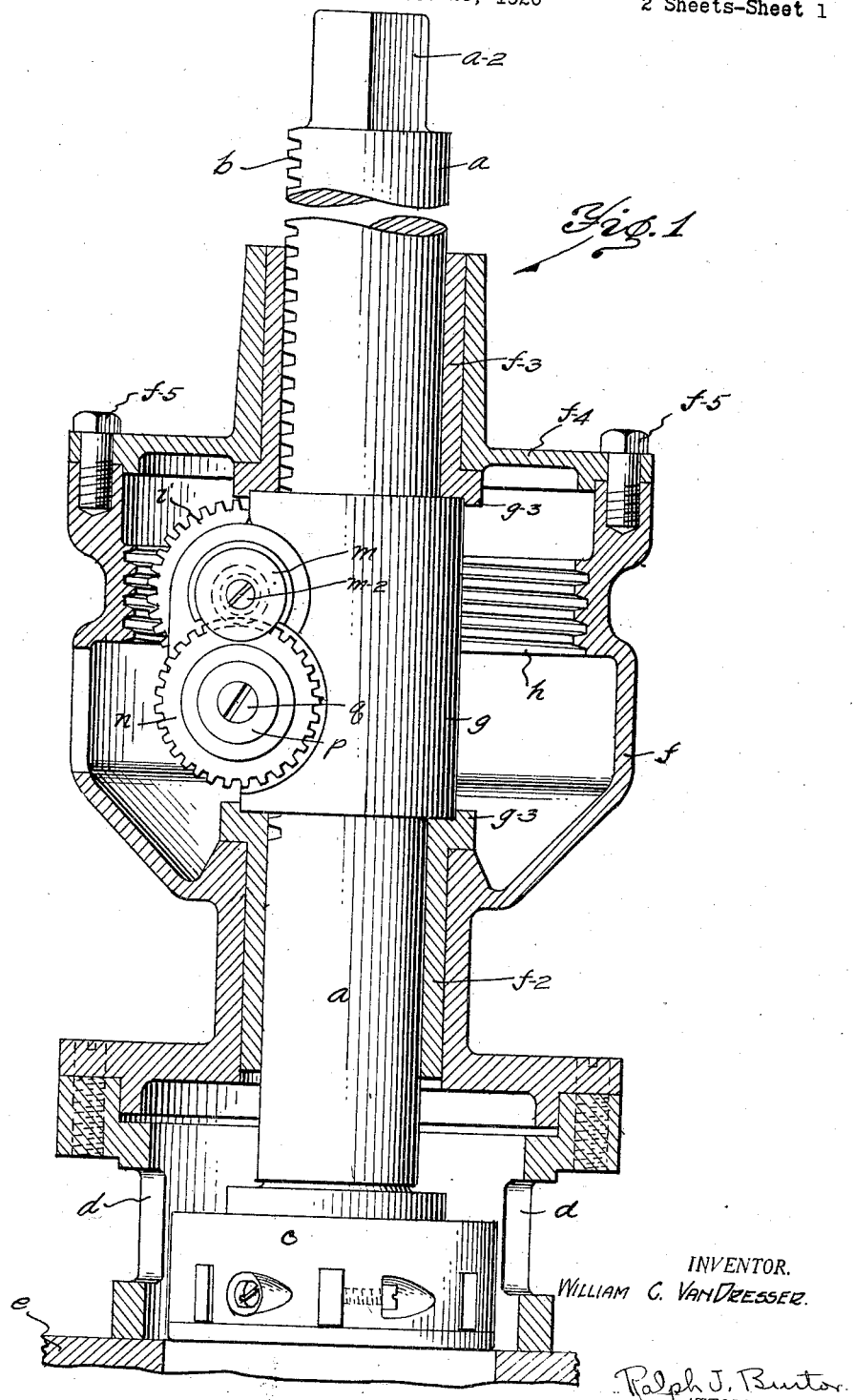

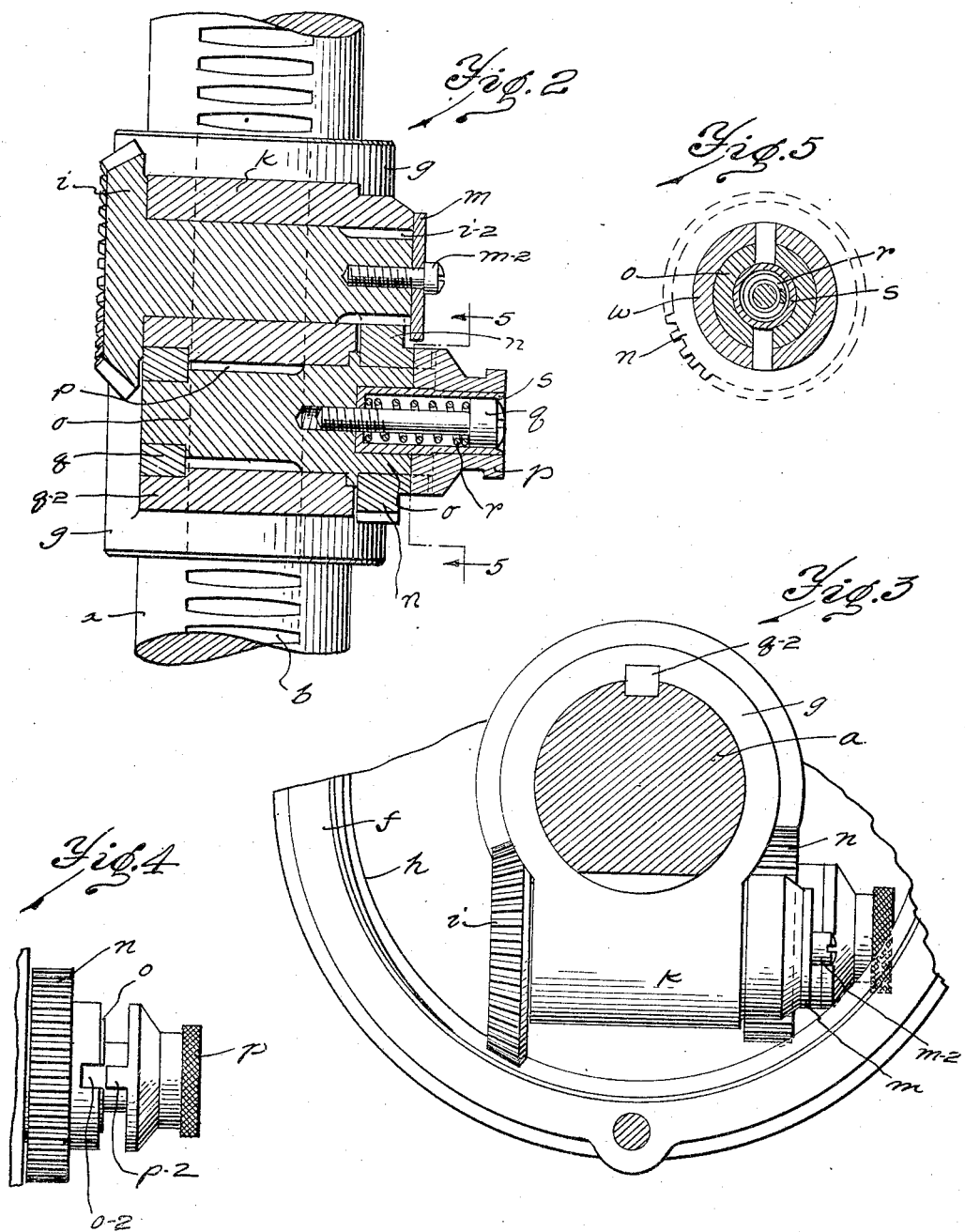

1,587,092

UNITED STATES PATENT OFFICE.

WILLIAM C. VAN DRESSER, OF DETROIT, MICHIGAN, ASSIGNOR TO VAN DRESSER BROTHERS, A COPARTNERSHIP COMPOSED OF WILLIAM C. VAN DRESSER, WESLEY B. VAN DRESSER AND FRANK P. VAN DRESSER.

BORING TOOL.

Application filed December 20, 1920. Serial No. 431,844.

Broadly my invention relates to means for advancing a driven spindle or feed bar. I provide feed mechanism adapted to cooperate with a rotating spindle so as to convert its movement of rotation into longitudinal movement at a desired rate of advance as shown in the drawings and herein described and claimed.

Particularly, my invention relates to an improved portable reboring tool for reaming cylinders. The object is to provide a reboring tool, the driven spindle of which is adapted to be advanced at a desired rate by means of an improved type of feed mechanism. The rate of advance for such spindle might be, for example, .03 of an inch per revolution.

A further object is the provision of feed mechanism adapted to be easily and quickly released from its driving couple with the spindle to permit removal of the spindle without hindrance by the feed mechanism, and also to permit the spindle to be driven independently of the feed mechanism, such as connecting the spindle with a drill press driving socket and driving at any of the varying rates provided by such means, or other power driving means.

In the drawings:

Fig. 1 is a view of my device in which the driving spindle is shown in elevation, the housing being sectioned to show the working parts.

Fig. 2 is a vertical section through the feed mechanism, the driving spindle being shown in elevation.

Fig. 3 is a plan in which the housing cover is removed.

Fig. 4 is a side elevation of the clutch mechanism showing the same disengaged.

Fig. 5 is a section taken on line 5—5 of Fig. 2.

Let $a$ indicate the driven spindle or rotating feed bar, the end of which, $a^2$, is adapted to be received by any conventional driving socket so it may be rotated. The opposite end of the spindle carries a cutter head, $c$. No claim of novelty is made to the cutter head, as any type of cutter head would serve the purpose, therefore no description is given of the cutter head. Along one side of the spindle is a rack $b$.

This rack spindle or feed bar is journalled for rotation in a housing $f$ by means of bearings $f^2$ and $f^3$. The rack occupies a comparatively small portion of the spindle surface and the spindle may therefore be of hardened steel possessing long wearing qualities. The housing is provided with a removable cover $f^4$, held in place by bolts $f^5$, and is supported by a base $d$, which is adapted to be attached to a cylinder block $e$ so as to center the boring tool over the cylinder.

The housing is provided with an internal thread $h$, here shown as a large acme thread suitable for the purpose desired.

The feed mechanism comprises a casing $g$ which is splined on the spindle by means of a key $g^2$, so that the casing will rotate with the spindle while permitting longitudinal movement of the spindle therethrough. The casing $g$ is supported in position by the retaining flanges $g^3$ on the bearings $f^2$ and $f^3$.

Casing $g$ carries a bevel gear $i$ which is engaged in the thread $h$ in the housing so that for each revolution of the spindle the bevel gear $i$ rotates the distance of one tooth. This bevel gear $i$ is carried by a spindle, at the other end of which is a reduction gear $i^2$. This bevel gear spindle is mounted for rotation in a bearing $k$ and it is held in position therein by means of a retaining washer $m$ secured to the end of the spindle by a pin $m^2$. This washer $m$ rests against the end of the bearing $k$. The bearing $k$ is cut away below the gear $i^2$ so that a gear $n$ carried by pinion spindle $o$ may mesh with the gear $i^2$.

The gear $n$ is freely mounted on the spindle $o$ so as to permit of independent rotation of the spindle, but is adapted to be locked thereto as shown in Figs. 2, 3 and 4, so as to rotate therewith. The spindle $o$ is provided with a pinion $p$ whch meshes with the rack $b$ on the feed bar $a$ so as to drive such bar when the pinion is driven. This spindle $o$ is mounted for rotation in bearngs $q$ and $q^2$.

When the gear $n$ is secured to the spindle $o$ so as to rotate therewith and the feed bar $a$ is rotated, the bevel gear $i$ being in engagement with the thread $h$ in the housing, will through the train of gears feed the feed bar through the housing.

As a means for securing the gear $n$ to the spindle $o$ I provide a clutch collar $p$ provided with a tongue $p^2$ adapted to be received in a groove $o^2$ in the end of the spindle $o$ which registers with a similar groove in the end of the gear so that when the tongue $p^2$ is received in the groove it locks the gear and the spindle together to rotate as one piece. This collar is held to the spindle by means of a pin $q$ threaded into the end of the spindle. This clutch collar is mounted yieldingly on the pin by means of a spring $r$ disposed within a sleeve pressed in the collar so as to be carried thereby so that when the collar is drawn outwardly to release the tongue $p^2$ from its engagement in the groove $o^2$, this outward movement is against the resistance of the spring $r$, which therefore serves to hold the clutch collar in position when seated.

What I claim is:

1. In a reboring tool, an internally threaded housing, a rack feed bar journaled for rotation therein, feed mechanism comprising a casing journaled in the housing and splined on the feed bar to rotate therewith, a spindle journaled in the casing and provided at one end with a driving gear adapted to engage in the thread of the housing so as to rotate through an arc of rotation equal to one tooth with each revolution of the feed bar, a pinion spindle journaled in the casing provided with a pinion engaged in the rack of the feed bar, a train of gears coupling said pinion spindle and driving gear spindle together for rotation, means for releasing one of the gears in said train from its supporting spindle so that the feed bar may be reciprocated independently of the feed mechanism.

2. In a reboring tool, an internally threaded housing, a feed bar extending through the housing, feed mechanism splined on the feed bar interior the housing comprising a gear engaged in the thread of the housing adapted to rotate on its own axis as it revolves with the feed bar, a pinion engaging with the rack of the feed bar, a train of reduction gears connecting said gear and pinion so the pinion will be driven by the rotation of the gear engaged in the housing thread, means for uncoupling said train of gears so as to permit the feed bar to be advanced or withdrawn independently of the feed mechanism, the pinion idling over the rack.

In testimony whereof, I, WILLIAM C. VAN DRESSER, sign this specification.

WILLIAM C. VAN DRESSER.